United States Patent
Guo et al.

(10) Patent No.: US 11,474,930 B2
(45) Date of Patent: Oct. 18, 2022

(54) SOFTWARE BUG REPRODUCTION

(71) Applicant: VMware, Inc., Palo Alto, CA (US)

(72) Inventors: Wei Guo, Sunnyvale, CA (US);
Deepika Rajendra Kalani, Santa Clara, CA (US); Yuanjun Yao, Durham, NC (US); Mihir Patil, Santa Clara, CA (US); Aravinda Kidambi Srinivasan, Mountain View, CA (US); Yang Ping, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 27 days.

(21) Appl. No.: 16/719,999

(22) Filed: Dec. 19, 2019

(65) Prior Publication Data
US 2021/0191842 A1     Jun. 24, 2021

(51) Int. Cl.
G06F 11/36     (2006.01)
G06F 11/34     (2006.01)

(52) U.S. Cl.
CPC ...... *G06F 11/3664* (2013.01); *G06F 11/3461* (2013.01); *G06F 11/364* (2013.01); *G06F 11/3636* (2013.01)

(58) Field of Classification Search
CPC ............. G06F 11/34–3495; G06F 11/36–3696
See application file for complete search history.

(56) References Cited

U.S. PATENT DOCUMENTS

| | | | |
|---|---|---|---|
| 10,346,295 B2 * | 7/2019 | Beyel, III | G06F 11/3692 |
| 2013/0173964 A1 * | 7/2013 | Okano | G06F 11/2294 714/33 |
| 2018/0300228 A1 * | 10/2018 | Beyel, III | G06F 11/3688 |
| 2020/0110557 A1 * | 4/2020 | Foo | G06F 11/108 |

OTHER PUBLICATIONS

Zhi, Q., et al., "Med: The Monitor-Eumulator-Debugger for Software Defined Networks", IEEE INFOCOM 2016—The 35th Annual IEEE International Conference on Computer Communications [online], 2016 [retrieved Mar. 12, 2021], Retrieved from Internet: <URL:https://ieeexplore.ieee.org/abstract/document/7524562>, pp. 1-9.*

(Continued)

*Primary Examiner* — Todd Aguilera
(74) *Attorney, Agent, or Firm* — Su IP Consulting

(57) ABSTRACT

Example methods and systems for software bug reproduction. One example method may comprise obtaining log information associated with multiple transactions processed by a control-plane node to configure a set of data-plane nodes and transform an initial network state to a first network state; and configuring a replay environment that is initialized to the initial network state, and includes a mock control-plane node and a set of mock data-plane nodes. The method may also comprise, based on the log information, replaying the multiple transactions using the mock control-plane node to configure the set of mock data-plane nodes and transform the replay environment from the initial network state to a second network state. Based on a comparison between the first network state and the second network state, a determination may be made as to whether a software bug is successfully reproduced in the replay environment.

21 Claims, 5 Drawing Sheets

(56) References Cited

OTHER PUBLICATIONS

Brian Burg et al., "Interactive Record/Replay for Web Application Debugging", UIST 2013, Oct. 8-11, 2013, ACM.
Frank Cornelis et al., "A Taxonomy of Execution Replay Systems", In Proceedings of International Conference on Advances in Infrastructure for Electronic Business, Education, Science, Medicine, and Mobile Technologies on the Internet, 2003.
Kirk Glerum et al., "Debugging in the (Very) Large: Ten Years of Implementation and Experience", .In Proceedings of the ACMSIGOPS 22nd Symposium on Operating Systems Principles, SOSP'09, Oct. 11-14, 2009, ACM.
Thomas J. Leblanc et al., "Debugging Parallel Programs with Instant Replay", IEEE Transactions on Computers, Apr. 1987, pp. 471-482, vol. C-36, No. 4.
Kyle Nordeen, "How to Overcome the Challenges of Reproducing Non-Reproducible Defects", Zephyr, Jul. 13, 2016.
Herbert Prähofer et al., "A Comprehensive Solution for Deterministic Replay Debugging of SoftPLC Applications", IEEE Transactions on Industrial Informatics, Nov. 2011, pp. 641-651, vol. 7, No. 4.
Steffen Herbold et al., "Improved Bug Reporting and Reproduction Through Non-intrusive GUI Usage Monitoring and Automated Replaying", In Software Testing, Verification and Validation Workshops (ICSTW), 2011 IEEE Fourth International Conference on IEEE, 2011, pp. 232-241.
Eric Sloof, "Introducing the NSX-T Platform", New Technical White Paper, Feb. 9, 2017.
Dhaval Vyas et al., "Bug Reproduction: A Collaborative Practice within Software Maintenance Activities", In COOP 2014 Proceedings of the 11th International Conference on the Design of Cooperative Systems, May 27-30, 2014, pp. 189-207.

* cited by examiner

SOFTWARE BUG REPRODUCTION

BACKGROUND

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines (VMs) running different operating systems may be supported by the same physical machine (e.g., referred to as a "host"). Each VM is generally provisioned with virtual resources to run an operating system and applications. The virtual resources may include central processing unit (CPU) resources, memory resources, storage resources, network resources, etc. In practice, software bugs may affect various entities in the SDN environment. For network diagnosis and debugging purposes, it is desirable to reproduce the software bugs.

DETAILED DESCRIPTION

Figure 1:
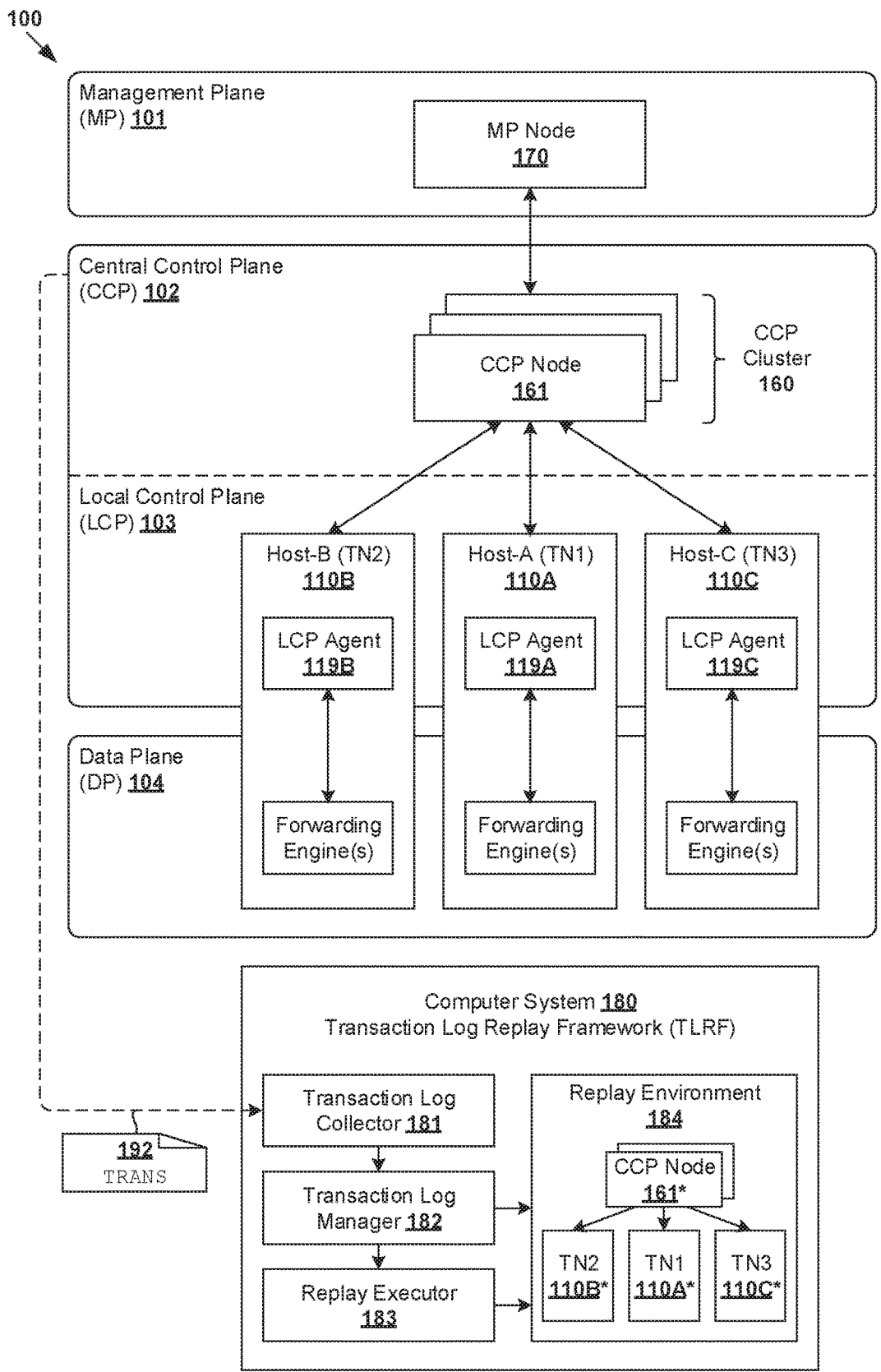
FIG. 1 is a schematic diagram illustrating an example software-defined networking (SDN) environment in which software bug reproduction may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first," "second" and so on are used to describe various elements, these elements should not be limited by these terms. These terms are used to distinguish one element from another. A first element may be referred to as a second element, and vice versa.

Software bug reproduction may refer generally to a recreation of a software bug that has been observed at an earlier time, such as when a product is operating in a production environment. In practice, software bug reproduction is an important step for diagnosing and fixing bugs, especially bugs that are not obvious to software developers. However, software bug reproduction is often time consuming and requires a lot of hardware resources. These challenges are compounded by the fact that repeated attempts may be required to reproduce software bugs, such as due to the non-deterministic nature of distributed systems. In some scenarios, developers may have to work with insufficient information from customers, tedious logistical efforts for bug reproduction setups and contextual issues that make bug reproduction challenging. As the size and complexity of a distributed system increases, network diagnosis and debugging may become increasingly time-consuming and resource-intensive.

According to examples of the present disclosure, software bug reproduction may be performed in an improved manner to facilitate network diagnosis and debugging. As used herein, the term "software bug" may refer generally to a defect, error, flaw, mistake, inconsistent or unexpected behavior, failure or fault in computer software. Depending on the desired implementation, examples of the present disclosure may facilitate large-scale debugging to reproduce software bugs that cause correctness and/or performance problems. Correctness problems may include situations where an entity (e.g., control-plane node) deviates from its expected behavior and reaches an inconsistent state. Performance problems may include processing delays, high central processing unit (CPU) utilization, memory issues (e.g., bloats, leakage, etc.). Any improvement in software bug reproduction may in turn reduce system downtime due to undiagnosed or undebugged issues, thereby improving system performance.

Figure 2:
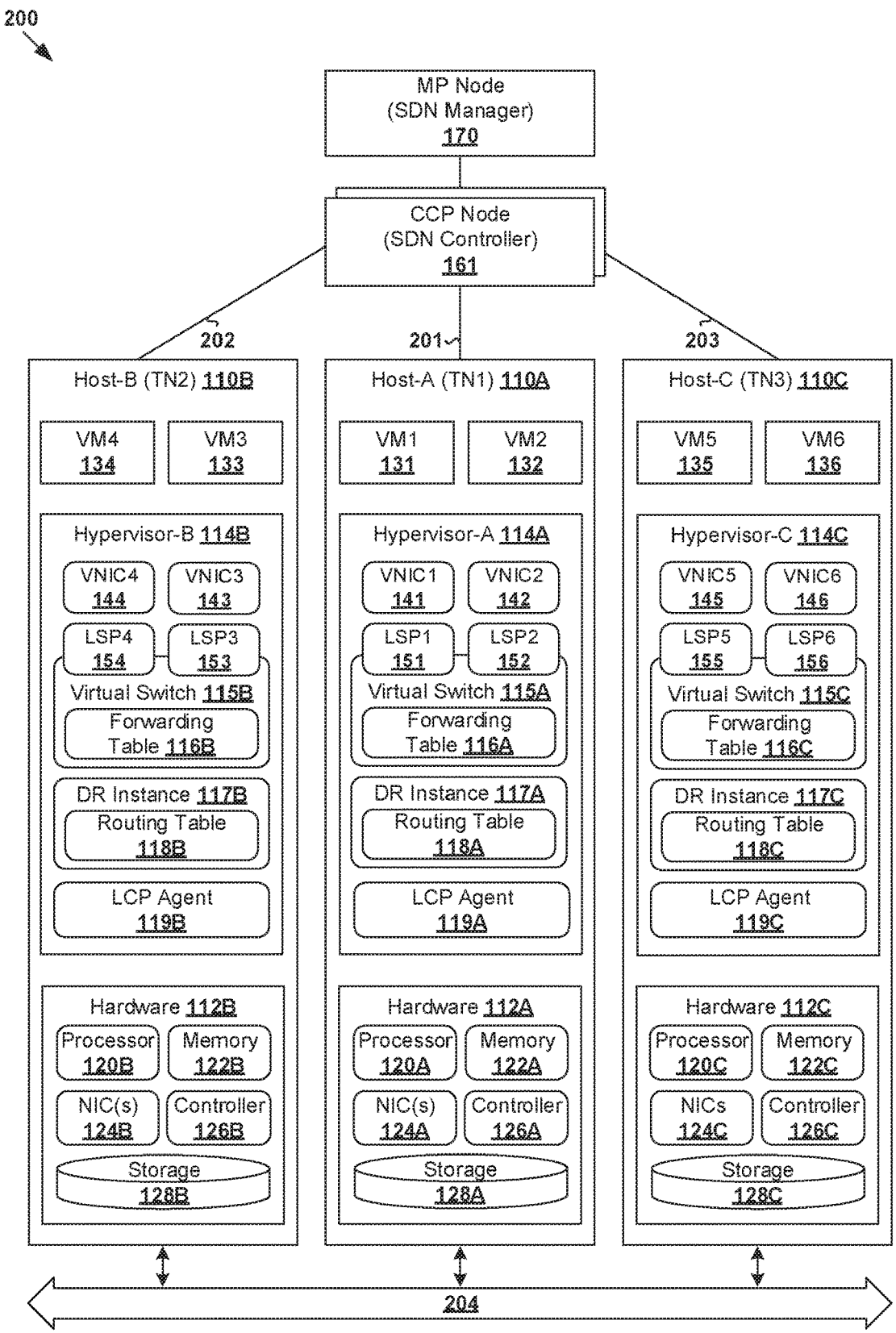
FIG. 2 is a schematic diagram illustrating an example physical implementation view of the SDN environment in FIG. 1.

Examples of the present disclosure may be implemented for any suitable distributed system, such as a software-defined networking (SDN) environment in FIG. 1 and FIG. 2. In particular, FIG. 1 is a schematic diagram illustrating example SDN environment 100 in which software bug reproduction may be performed. FIG. 2 is a schematic diagram illustrating a physical implementation view 200 of SDN environment 100 in FIG. 1. It should be understood that, depending on the desired implementation, SDN environment 100 may include additional and/or alternative components than that shown in FIG. 1 and FIG. 2.

In the example in FIG. 1, SDN environment 100 may include multiple planes: management plane (MP) 101, control plane 101-102 and data plane (DP) 104. In practice, any alternative and/or additional planes may be configured. Each "plane" may be implemented as a set of processes, modules and agents residing on physical and/or virtual entities. MP 101 may provide end-users with an entry point to configure SDN environment 100. Manager or MP node 170 may be deployed to handle MP responsibility, such as configuration persistence to achieve a desired network state, input validation, user management, policy management, etc. One example of a manager node is the NSX manager, which provides a user interface for creating, configuring and monitoring logical networking components (e.g., logical switches, logical routers), security services and distributed firewall (DFW), networking services, etc. Any suitable user interface(s) may be supported, such as graphical user interface (GUI), command line interface (CLI) and/or application programming interfaces (APIs).

Control plane 102-103 is responsible for learning the runtime state of DP 104 and making changes based on configuration from MP 101. The control plane may be further separated into a central control plane (CCP) 102 that runs on a cluster of CCP nodes (see 160), and local control plane (LCP) 103 that runs on DP nodes (see 110A-C). For example, CCP node 161 may compute some runtime state based on configuration from MP 101 and disseminate topology information reported from DP 104. LCP 103 may be responsible for monitoring link status, pushing configuration changes to forwarding engines, etc. As used herein, the term "distributed system" may refer generally to a system whose functionalities or computations may be distributed or spread among a cluster of nodes. In the example in FIG. 1, CCP 102 represents an example distributed system whose computations are distributed among CCP nodes in cluster 160, such as for load balancing, resiliency, etc.

One example of a CCP node (also known as SDN controller) is the NSX controller component of VMware NSX® (available from VMware, Inc.), which is configurable using MP node 170 in the form of an NSX manager. In practice, CCP cluster 160 may be deployed as a three-node cluster using a datastore (e.g., CorfuDB) for clustering and replication. CCP node 161 and/or MP node 170 may be implemented using physical machine(s), virtual machine(s), a combination thereof, etc. Members of CCP cluster 160 may distribute nodes residing on DP 104 among themselves and replicate runtime state information asynchronously such that each member has a consistent global view of virtual networks in SDN environment 100.

DP 104 is responsible for packet forwarding based on policy information configured using MP 101 and topology information shared by data-plane nodes (also known as "transport nodes" (TNs) or hypervisors) such as hosts 110A-C. Referring also to FIG. 2, host 110A/110B/110C may include suitable hardware 112A/112B/112C and virtualization software (e.g., hypervisor-A 114A, hypervisor-B 114B, hypervisor-C 114C) to support various virtual machines (VMs) 131-136. To send and receive the control information (e.g., configuration changes), host 110A/110B/110C may implement local control plane (LCP) agent 119A/119B/119C to interact with CCP cluster 160. For example, control-plane channel 201/202/203 may be established between CCP node 161 and host 110A/110B/110C using TCP over Secure Sockets Layer (SSL), etc.

Hypervisor 114A/114B/114C maintains a mapping between underlying hardware 112A/112B/112C and virtual resources allocated to respective VMs 131-136. For example, host-A 110A supports VM1 131 and VM2 132; host-B 110B supports VM3 133 and VM4 134; and host-C 110C supports VM5 135 VM6 136. Hardware 112A/112B/112C includes suitable physical components, such as central processing unit(s) (CPU(s)) or processor(s) 120A/120B/120C; memory 122A/122B/122C; physical network interface controllers (NICs) 124A/124B/124C; controllers 126A/126B/126C; and storage disk(s) 128A/128B/128C, etc.

Virtual resources are allocated to respective VMs 131-136 to support a guest operating system (OS) and application(s). For example, the virtual resources may include virtual CPU, guest physical memory, virtual disk, virtual network interface controller (VNIC), etc. Hardware resources may be emulated using virtual machine monitors (VMMs). For example in FIG. 1, VNICs 141-146 are emulated by corresponding VMMs (not shown for simplicity). The VMMs may be considered as part of respective VMs 131-136, or alternatively, separated from VMs 131-136. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" may refer generally to multiple packets. The term "layer-2" may refer generally to a link layer or Media Access Control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hosts 110A-C also maintain data-plane connectivity via physical network 204. Hypervisor 114A/114B/114C implements virtual switch 115A/115B/115C and logical distributed router (DR) instance 117A/117B/117C to handle egress packets from, and ingress packets to, corresponding VMs 131-136. Through virtualization of networking services in SDN environment 100, logical overlay networks may be provisioned, changed, stored, deleted and restored programmatically without having to reconfigure the underlying physical hardware architecture. A logical overlay network (also known as "logical network") may be formed using any suitable tunneling protocol, such as Generic Network Virtualization Encapsulation (GENEVE), Virtual eXtensible Local Area Network (VXLAN), Stateless Transport Tunneling (STT), etc. Logical overlay networks may include logical switches and logical DR.

In SDN environment 100, logical switches and logical DRs may be implemented in a distributed manner and can span multiple hosts to connect VMs 131-136. For example, logical switches that provide logical layer-2 connectivity may be implemented collectively by virtual switches 115A-C and represented internally using forwarding tables 116A-C at respective virtual switches 115A-C. Forwarding tables 116A-C may each include entries that collectively implement the respective logical switches. Further, logical DRs that provide logical layer-3 connectivity may be implemented collectively by DR instances 117A-C and represented internally using routing tables 118A-C at respective DR instances 117A-C. Routing tables 118A-C may each include entries that collectively implement the respective logical DRs.

Packets may be received from, or sent to, each VM via an associated logical switch port. For example, logical switch ports 151-156 (labelled "LSP1" to "LSP6") are associated with respective VMs 131-136. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-C in the example in FIG. 1, whereas a "virtual switch" may refer generally to a software switch or software implementation of a physical switch. In practice, there is usually a one-to-one mapping between a logical port on a logical switch and a virtual port on virtual switch 115A/115B/115C. However, the mapping may change in some scenarios, such as when the logical port is mapped to a different virtual port on a different virtual switch after migration of the corresponding VM (e.g., when the source host and destination host do not have a distributed virtual switch spanning them).

Conventionally, when it comes to software bugs experienced at a large scale, the debugging process is generally time-consuming and resource-intensive. For example, CCP cluster 160 in SDN environment 100 may experience large-scale problems such as intermittent incorrectness, abnormal latencies and out-of-memory that may in turn affect the performance of a large number of TNs. Sometimes there is not enough information to identify the problem, and a developer may have to reproduce the issue after instrumenting the code with more log or other debugging information. However, this manual approach has some drawbacks. It costs a lot of time and company resources to reproduce the issue repeatedly due to time involved in testbed deployment and setup. Also, holding a large-scale deployment for days in order to debug a problem is quite costly. If the deployment is at a customer site, it may be even harder to get access to deployed networks for debugging.

Further, a one-off reproduction is usually insufficient to find the root cause of the problem, such as when the bug involves a race condition. In that case, multiple runs are needed, increasing the debugging time. Another problem is that the information about the exact sequence of events is usually needed for bug reproduction. Often the bug reporter (user) may not know or remember what information to include and pass onto developers responsible for problem diagnosis. Once a bug is identified and fixed, it needs to be tested to confirm that it works well. The same testbed and setup may be needed to create the same situation where the problem happened so that the fix can be tested appropriately. The above issues slow down the process of debugging and applying fixes, which is undesirable.

Software Bug Reproduction

According to examples of the present disclosure, software bug reproduction may be implemented in an improved manner according to a transaction log replay framework (TLRF). Since CCP cluster 160 may be responsible for a large number of TNs (e.g., hundreds or thousands) in SDN environment 100, any improvement in the debugging process of large-scale problems will in turn reduce system downtime and improve the overall performance. It should be understood that examples of the present disclosure may be implemented using any suitable computer system 180. In one example, computer system 180 may also support CCP node 161 or any other member(s) of CCP cluster 160. Alternatively, computer system 180 may be a separate system that is capable of interacting with (live) CCP 102 and/or MP 101 via any suitable network. Computer system 180 may be implemented using physical machine(s) and/or virtual machine(s).

Figure 3:
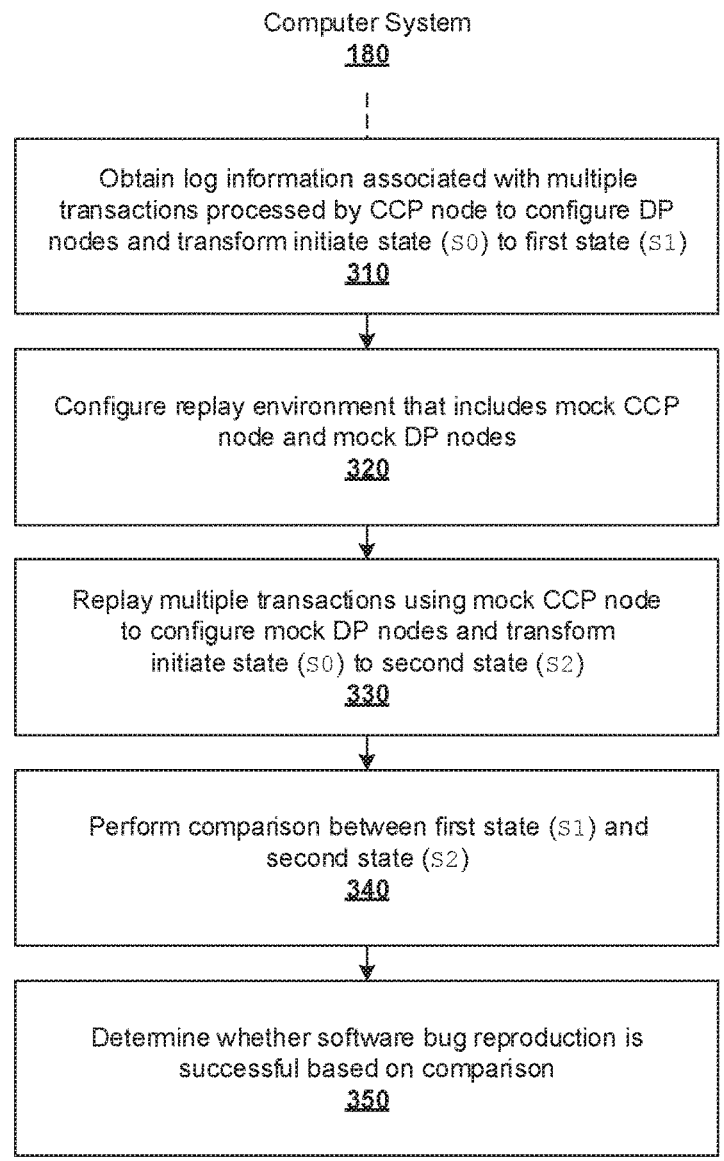
FIG. 3 is a flowchart of an example process for a computer system to perform software bug reproduction in an SDN environment.

Computer system 180 may implement any suitable components for software bug reproduction, such as transaction log collector 181, transaction log manager 182, and transaction log replay executor 183. In more detail, FIG. 3 is a flowchart of example process 300 for a computer system to perform software bug reproduction in SDN environment 100. Example process 300 may include one or more operations, functions, or actions illustrated by one or more blocks, such as 310 to 350. The various blocks may be combined into fewer blocks, divided into additional blocks, and/or eliminated depending on the desired implementation. In the following, CCP node 161 will be used as an example "control-plane node," and hosts 110A-C as example "data-plane nodes."

At 310 in FIG. 3, log information associated with multiple transactions (see 192 in FIG. 1) may be obtained. The log information may be processed by CCP node 161 to configure hosts 110A-C and transform an initial network state (S0) to a first network state (S1). As will be described using FIGS. 4-5, block 310 may include capturing transactions 192 from (live) CCP node 161 operating in a production environment to generate log information. The log information may be associated with one or more of the following transactions: (a) MP transactions associated with MP node 170 residing on MP 101, (b) DP or TN transactions associated with hosts 110A-C residing on DP 104 and (c) replication transactions associated with CCP cluster 160.

As used herein, the term "transaction" may refer generally to information identifying a configuration (as a whole) and/or operation(s) performed to achieve a particular network state during the configuration. For example, a configuration operation may be to add, delete or update a logical networking element (e.g., logical switch, logical router, DFW engine, VNIC, logical port, etc.) supported by DP 104. Transactions 192 may be processed atomically to implement configuration changes in SDN environment 100. By logging transactions 192, the log information may be generated and later used to identify an initial network state of SDN environment 100, how a particular transaction changes that state, and what the new state might look like after the transaction is processed.

At 320 in FIG. 3, a replay environment (see 184 in FIG. 1) that is initialized to the initial network state (S1) may be configured. Throughout the present disclosure, an asterisk (*) is used to indicate a mock node or component. In the example in FIG. 1, replay environment 184 may include mock CCP node 161* and mock hosts 110A*-C* to mimic respective CCP node 161 and hosts 110A*-C*. Note that the "initial network state" may represent any state at a particular point in time prior to the processing of transactions 192.

At 330 in FIG. 3, based on the log information, multiple transactions 192 may be replayed using mock CCP node 161* to configure and mock hosts 110A-C* within replay environment 184. The transaction replay also transforms replay environment 184 from the initial network state (S0) to a second network state (S2). Block 330 may include feeding transactions 192 to mock CCP node 161* for processing at a desired replay speed.

At 340 and 350 in FIG. 3, based on a comparison between the first network state (S1) and second network state (S2), it is determined whether a software bug is successfully reproduced in replay environment 184. The software bug may be affecting CCP node 161 and/or host 110A/110B/110C. For example, in response to identifying a match between first network state (S1) and second network state (S2), the software bug is determined to have been successfully reproduced.

As will be described further using FIGS. 4-5, computer system 180 may implement any suitable components for software bug reproduction, such as transaction log collector 181 to perform block 310, transaction log manager 182 to perform block 320 and replay executor 183 to perform blocks 330-350. In practice, transaction replay may be performed in a time-controlled manner, with breakpoints and debugging logs inserted as desired by the developers. Using examples of the present disclosure, reproduction attempts may be easier to implement and less resource-intensive, thereby enabling an iterative approach for network diagnosis and debugging.

CCP Processing Pipeline

Figure 4:
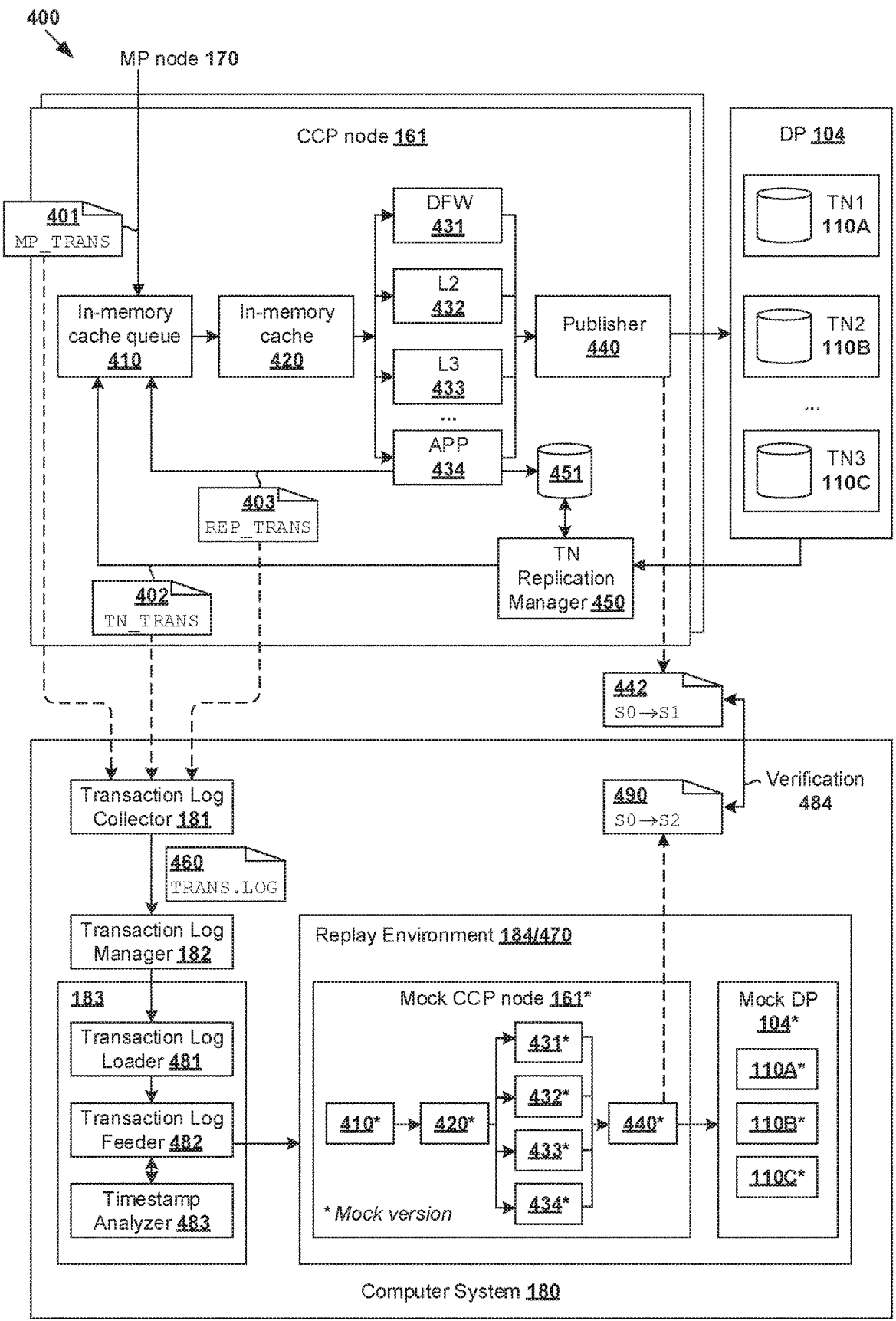
FIG. 4 is a schematic diagram illustrating an example software bug reproduction according to a transaction log replay framework.

FIG. 4 is a schematic diagram illustrating example software bug reproduction 400 according to a transaction log replay framework. In this example, CCP node 161 may include in-memory cache queue 410 that collects transactions 401-403 from various sources. From in-memory cache queue 410, transactions 401-403 may be batched using in-memory cache 420 before being processed atomically using application(s) 431-434 and pushed towards DP 104 using publisher 440. In practice, a network state may be defined by virtual network configurations. An updated state may be built on a previous state with a delta update of network configuration(s).

Three transaction types are shown: MP transactions (see 401), hypervisor or TN transactions (see 402) and replication transactions (see 403). Originating from MP node 170, MP transactions 401 may include any suitable information that identifies a desired state for hosts 110A-C. CCP node 161 is configured to compute configuration changes required to achieve the desired state and instruct relevant hosts 110A-C to apply the changes. TN transactions 402 originating from hosts 110A-C may be collected using TN replication manager 450. In practice, TN transactions 402 may include any suitable information identifying a runtime state of respective hypervisors 114A-C, such as topology information associated with logical overlay networks, etc.

Replication transactions 403 may originate from CCP 102 itself. In practice, a set of computations to be performed by CCP 102 may be shared across CCP cluster 160. In this case, each controller node in the cluster performs a subset of the computations and shares the results with the rest of CCP cluster 160 by replicating in data store 451. These results may be a collection of protocol buffer (protobuf) messages that form replication transactions 403. In practice, data store 451 may be a Corfu database, which is a consistency platform designed around the abstraction of a shared log.

CCP 102 may use transactions 401-403 from all three sources to create and maintain its view of the current network state of SDN environment 100. For tracking purposes, each transaction may be assigned with a unique transaction identifier (ID) such that it may be identified and tracked throughout the CCP processing pipeline. An atomic update to the current state may be performed as part of a CCP transaction. In practice, multiple network updates (also known as "messages") may be batched and applied as a single transaction. In this case, a particular transaction ID may be mapped to multiple network updates.

Next, transactions 401-403 may be processed atomically by various application(s) implemented by CCP node 161. Example applications include DFW application (see 431) to perform firewall rule configuration, L2 application (see 432) to perform logical switch configuration, L3 module (see 433) to perform logical router configuration, and application (see 434) to perform any other configuration(s). Publisher 440 is configured to interact with hosts 110A-C to apply configuration changes. In practice, a transaction may involve two operations: (a) applying update(s) to CCP's view of an initial network state (S0) and (b) instructing hypervisors 114A-C to apply the update(s) in DP 104, thereby transforming the initial network state (S0) to an updated network state (S1).

Transaction Log Replay Framework (TLRF)

According to examples of the present disclosure, computer system 180 may be deployed to perform automatic bug reproduction. In the following, the example in FIG. 4 will be explained using FIG. 5, which is a flowchart of example detailed process 500 for bug reproduction in SDN environment 100. Example process 500 may include one or more operations, functions, or actions illustrated at 510 to 560. The various operations, functions or actions may be combined into fewer blocks, divided into additional blocks, and/or eliminated depending on the desired implementation.

(a) Transaction Log Information Collection

Figure 5:
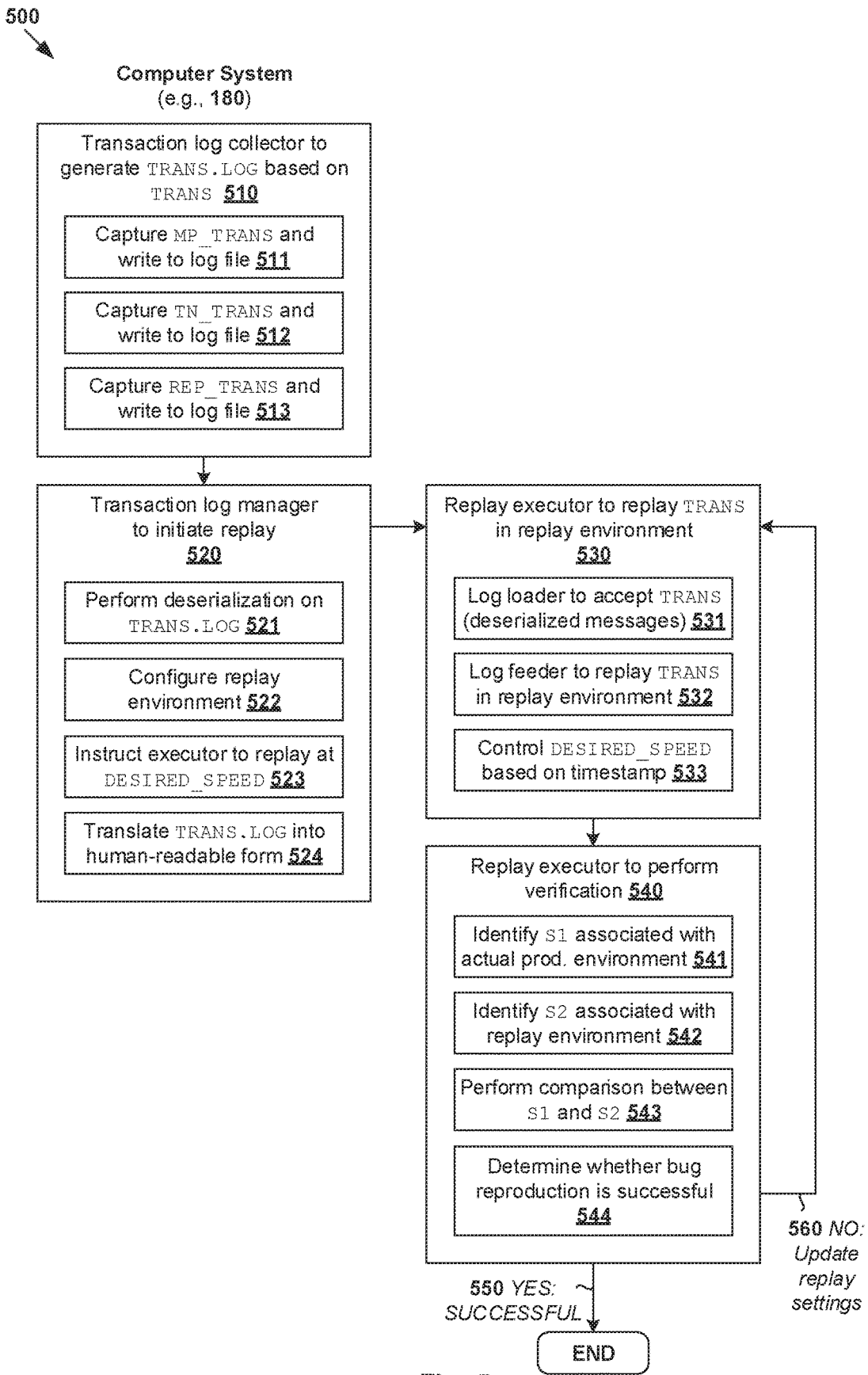
FIG. 5 is a flowchart of an example detailed process for a computer system to perform software bug reproduction in an SDN environment.

At 510 in FIG. 5, transaction log collector 181 may generate log information associated with transactions 401-403 to be processed by CCP node 161 to configure hosts 110A-C. In particular, block 510 may involve transaction log collector 181 capturing MP transactions (see 511), TN transactions (see 512) and replication transactions (see 513) from in-memory cache queue 410, and writing each transaction in a log file (see 460 in FIG. 4). Log information 460 may be any suitable format, such as a collection of serialized input messages that are written to the log file (e.g., one message at a time).

Since transactions 401-403 are used for configuring virtual or logical network entities supported by hosts 110A-C, log information 460 provides an insight of what the current state of the system is, how a transaction changes the current state, and what the new state is after the transaction is processed. In practice, the types of transactions based on which log information 460 is generated may be enabled or disabled, such as using any suitable GUI, CLI, API, etc. Another approach is to enable or disable the sources, including MP 101 for MP transactions, DP 104 for TN transactions and CCP 102 for replication transactions. For example, a user may enable log collection for all three transactions (MP, TN and replication), or select source(s) from which the transactions are collected.

(b) Transaction Log Management

At 520 in FIG. 5, transaction log manager 182 may initiate a replay of transactions 401-403 based on log information 460. In particular, at 521, transaction log manager 182 may transform log information 460 to a form that is consumable or executable by transaction replay executor 183. In practice, transaction log manager 182 may include a subcomponent, transaction log transformer (not shown for simplicity), to parse serialized log information 460, perform deserialization and feed the output (i.e., deserialized messages) to replay executor 183.

At 522 in FIG. 5, transaction log manager 182 may set up replay environment 470 to replay transactions 401-403. This may include creating or initializing various mock components and connections in replay environment 470 to emulate CCP node 161 and hosts 110A-C. To mimic the behavior of CCP node 161 residing on CCP 102, replay environment 470 includes various components, including mock in-memory cache queue 410*, mock in-memory cache 420*, mock applications 431*-434* and mock publisher 440*. In practice, mocking may be performed to mimic or simulate the behavior of a component in a production environment. The term "mock" may refer generally to a replica, emulation or simulation of that component.

Replay environment 470 further includes mock DP 104* hosts 110A-C* to mimic the behavior of respective hosts 110A-C. Mock connections among various mock components may also be established to mimic communication or interaction among them. In the case of deterministic replay, replay environment 470 may be initialized with an initial state on a local machine for successful replay. Any suitable test framework may be used to simulate replay environment 470 on computer system 180. For example, JUnit is an open source test framework that may be used to write and run repeatable tests on computer system 180. In practice, multiple replay environments may be set up in practice to allow developers to perform network diagnosis and debugging in parallel.

At 523 in FIG. 5, transaction log manager 182 may instruct replay executor 183 to replay transactions 401-403 in a time-controller manner at a desired replay speed. In practice, transactions 401-403 may be replayed in succession of one another by default. In cases where timing of transactions could be a factor to consider during debugging, a user may adjust the desired speed. In practice, the speed does not have to be constant and may be adjusted during the replay.

At 524 in FIG. 5, transaction log manager 182 may transform log information 460 (e.g., in binary format after serialization) to a human-readable format. This is to allow developers to inspect the content of transactions 401-403 during debugging. The corresponding transaction ID of each transaction may be used to track its progress or result throughout the mock CCP processing pipeline.

(c) Replay Execution

At 530 in FIG. 5, replay executor 183 may replay transactions 401-403 to reproduce bug(s) affecting CCP node 161 and/or particular host 110A/110B/110C. This may involve replay executor 183 differentiating different types of transactions (e.g., MP, TN, replication) and processing them according to their type. In the example in FIG. 4, replay executor 183 may further include various sub-components: transaction log loader 481, transaction log feeder 482 and timestamp analyzer 483.

In more detail, at 531 in FIG. 5, transaction log loader 481 may accept deserialized messages from transaction log manager 182 along with the transaction ID each message belongs to. Since transactions may be logged concurrently, it is possible for the messages within a transaction to interleave with other messages from different transactions. To handle this, transaction log loader 481 may use a map to keep track of all messages belonging to a single transaction. When all the messages for a given transaction identified, transaction log loader 481 may provide that transaction to the next component (i.e., transaction log feeder 482) for processing.

At 532 in FIG. 5, transaction log feeder 482 may replay transactions in replay environment 470. Similar to the production environment, this may involve processing transactions using mock CCP processing pipeline at mock CCP node 161* using mock queue 410*, mock cache 420*, mock applications 431-434* and mock publisher 440*. Each transaction may be processed based on an operation type, such as add, delete or update a virtual network entity supported by any of mock hosts 110A-C*.

At 533 in FIG. 5, timestamp analyzer 483 may work closely with transaction log feeder 482 to feed transactions for replay in chronological order. Block 533 may involve timestamp analyzer 483 analyzing timestamp information associated with transactions 401-403 to identify a time difference between consecutive transactions. Based on the timestamp information, timestamp analyzer 483 may control the processing speed of mock CCP node 161* according to the desired speed configured at block 523. For example, the time difference between two consecutive transactions may be proportional to desired speed. Where appropriate, this functionality could be enabled to debug timing-related issues.

(d) Replay Verification

At 540 in FIG. 5, replay executor 183 may perform verification to determine whether bug reproduction is successful. In particular, at 541, replay executor 183 may identify a first network state (see "S1" 442) associated with CCP node 161 and hosts 110A-C in the actual production environment. At 542, replay executor 183 may identify a second network state (see "S2" 490) associated with mock CCP node 161* and mock hosts 110A-C* after the replay. In practice, "S1" 442 may be extracted from a dump file ("first information") generated by publisher 440 in the production environment, and "S2" 490 from another dump file ("second information") generated by mock publisher 440* in replay environment 470. Depending on the desired implementation, the dump files may include any suitable key-value pairs, such as component ID, type of component (e.g., logical switch port and logical router port), receiver ID identifying TN to which data needs to be sent, data to be sent, etc.

At 543 in FIG. 5, replay executor 183 may compare (a) first network state (S1) 442 associated with the production environment with (b) second network state (S2) 490 associated with replay environment 470. See also verification process 484 in FIG. 4. This way, the mock result generated using replay environment 470 may be verified based on the actual result from CCP node 161. At any given point, CCP node 161 may maintain state information associated with each hypervisor 114A/114B/114C.

At 544 in FIG. 5, based on the comparison, replay executor 183 may determine whether the bug reproduction is successful. In response to identifying a match between "S1" 442 and "S2" 490, the bug reproduction is considered to be successful (see 550). Otherwise (unsuccessful), if there is any discrepancy between the two states, the bug reproduction is considered to be unsuccessful or a developer is alerted for further analysis. In this case (see 560), the replay may be repeated, such as using different replay setting(s) (e.g., speed, additional or alternative transactions). If unsuccessful again, the process in FIG. 5 may be stopped after a predetermined number of attempts.

Example Case Studies

Examples of the present disclosure may be implemented without necessitating a dedicated testbed for debugging. Using examples of the present disclosure, transaction replay may be implemented to reduce, if not eliminate, the time actual components (e.g., CCP node 161, hosts 110A-C) spend on executing or processing test inputs for debugging purposes. The reduction in time is anywhere from days/weeks to a matter of minutes or hours. With such a setup, it is possible to reproduce complex tests on just a developer's machine. This provides an immensely useful tool for a developer to reproduce software bugs as many times as necessary to root cause the problem. At each replay, any log or metric information may be collected.

To evaluate TLRF, the time saved to reproduce software bugs in replay environment 470 may be measured. In one experiment, four different transaction log datasets are collected, and the time difference between a first log item and a last log item is calculated. The time difference may be compared with the time taken by computer system 180 to reproduce the software bugs on test setup. On average, software bug reproduction is faster (e.g., 180$x$ faster in some experiments) due to the elimination of CCP's idle time, and time gaps between transactions.

Using computer system 180, software bug reproduction may be performed using log information generated from transactions 401-403 that are captured in real time. This reduces, if not eliminates, the reliance of customer's reports that may not describe the problem adequately. Examples of the present disclosure may be implemented for bugs that are generally difficult to reproduce and root cause. As long as replay environment 470 is able to reproduce a bug once, the bug may be root-caused, thereby improving the overall network quality and performance. Some case studies are presented below.

(a) Case 1: DFW bug

In a first example, CCP node 161 may be doing incorrect calculation for DFW application 431. In practice, writing unit tests to debug the issue may not work. Further, enabling trace and debug logs in actual scale or longevity test or customer environment may be difficult. To debug this issue, extra debug and trace logs may be enabled to identify the code where CCP node 161 may have performed an incorrect calculation and went into an inconsistent state. In this case, the following observation may be made by a developer who uses TLRF for bug reproduction: "replay from transaction log points to suspicious codes in handling removed fields in a configured DFW Rule. Running more tests to confirm."

(b) Case 2: scale bug

In a second example, bug reproduction may be performed for a scale setup with 768 hypervisors connected to CCP 102. The configuration consists of 3050 logical switch, 616 logical routers and 15360 logical ports. In this case, log information may be collected for 20 hours 19 minutes which is 1219 minutes. By comparison, a replay may take around 6.9 (~7) minutes to process the same set of transactions associated with the configuration.

In this case, the following observation may be made by a developer who uses TLRF for bug reproduction: "Some logging fixes have been made, and the same transaction replayed to find out the benefits of the fixes. Even without the fixes, the whole transaction may be processed in about 3 minutes. It does not seem like this happens on all CCP restarts. Out of the many restarts, only some had an issue with high delay for falcon. Another observation was that most of these delays coincide with lot of garbage collection (GC) activities."

It should be noted that the replay duration is not directly proportional to the actual execution duration. During replay, transactions may be fed sequentially into mock in-memory cache 420* without any delay. In this case, the time required by MP 101 to process relevant transactions or time required to setup the configuration may be eliminated because all transactions performed by CCP 102 are already logged.

(c) Case 3: memory leak

In a second example, bug reproduction may be performed for a memory leak in CCP 102. The memory leak may occur when a table storing CCP metrics has been accumulating data for every CCP transaction and not recycling older metrics. Conventionally, a quality engineer may take weeks to consistently generate CCP transaction from MP 101 to discover this issue. Using examples of the present disclosure, relevant transactions may be replayed at a faster rate, which allows the memory leak to be identified and fixed more efficiently.

Enhancements

Depending on the desired implementation, computer system 180 may implement a query and search mechanism to provide a visualization of CCP 102 and DP 104, as well as corresponding mock versions. A log-correlator may also be implemented to facilitate analysis and tracking of transactions across different components in CCP 102 based on transaction ID and/or virtual network entity ID, etc.

Although explained using VMs, it should be understood that SDN environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 6, container technologies may be used to run various containers inside respective VMs. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 5. For example, the instructions or program code, when executed by the processor of the computer system, may cause the processor to perform network troubleshooting according to examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a computer system to perform software bug reproduction, the method comprising:
   obtaining log information associated with multiple transactions atomically processed by a control-plane node to configure a set of data-plane nodes and transform an initial network state to a first network state, wherein each of the transactions is assigned with a unique transaction identifier (ID), and wherein the multiple transactions include management-plane, control-plane, and data-plane configuration transactions that respectively originate from a management-plane node, from the control-plane node, and from at least one of the set of data-plane nodes;
   configuring a replay environment that is initialized to the initial network state, and includes a mock control-plane node and a set of mock data-plane nodes to respectively mimic the control-plane node and set of data-plane nodes;
   based on the log information, replaying the multiple transactions using the mock control-plane node to configure the set of mock data-plane nodes and transform the replay environment from the initial network state to a second network state, wherein the transaction ID of each transaction is used to track a progress or result of the transaction throughout a processing pipeline of the mock control-plane node;
   based on a comparison between the first network state and the second network state, determining whether a software bug is successfully reproduced in the replay environment; and
   debugging at least one of a correctness problem or a performance problem, in the configuration of the set of data-plane nodes, that is caused by the software bug.

2. The method of claim 1, wherein obtaining the log information comprises:
   capturing the multiple transactions from the control-plane node operating in a production environment to generate the log information.

3. The method of claim 2, wherein obtaining the log information comprises:
   generating the log information associated with transactions that include one or more of: (a) management-plane transactions associated with the management-plane node, (b) data-plane transactions associated with the set of data-plane nodes, and (c) replication transactions associated with a cluster that includes the control-plane node.

4. The method of claim 1, wherein replaying the multiple transactions comprises:
   processing, each of the multiple transactions, using an application implemented by the mock control-plane node to perform at least one of: distributed firewall configuration, logical network configuration, logical switch configuration, and logical router configuration.

5. The method of claim 1, wherein replaying the multiple transactions comprises:
   analyzing timestamp information associated with the multiple transactions; and
   based on the timestamp information, feeding the multiple transactions to the mock control-plane node at a replay speed.

6. The method of claim 1, wherein determining whether the software bug is successfully reproduced comprises:
   identifying the first network state based on first information generated by a publisher component of the control-plane node, wherein the publisher component is capable of pushing configuration changes to the set of data-plane nodes in a production environment; and
   identifying the second network state based on second information generated by a mock publisher component of the mock control-plane node, wherein the mock publisher component is capable of pushing configuration changes to the set of mock data-plane nodes in the replay environment.

7. The method of claim 1, wherein determining whether the software bug is successfully reproduced comprises:
   in response to identifying a match between the first network state with the second network state, determining that the software bug is successfully reproduced.

8. A non-transitory computer-readable storage medium that includes a set of instructions which, in response to execution by a processor of a computer system, cause the processor to perform a method of software bug reproduction, wherein the method comprises:
   obtaining log information associated with multiple transactions atomically processed by a control-plane node to configure a set of data-plane nodes and transform an initial network state to a first network state, wherein each of the transactions is assigned with a unique transaction identifier (ID), and wherein the multiple transactions include management-plane, control-plane, and data-plane configuration transactions that respectively originate from a management-plane node, from the control-plane node, and from at least one of the set of data-plane nodes;
   configuring a replay environment that is initialized to the initial network state, and includes a mock control-plane node and a set of mock data-plane nodes to respectively mimic the control-plane node and set of data-plane nodes;
   based on the log information, replaying the multiple transactions using the mock control-plane node to configure the set of mock data-plane nodes and transform the replay environment from the initial network state to a second network state, wherein the transaction ID of each transaction is used to track a progress or result of the transaction throughout a processing pipeline of the mock control-plane node;

based on a comparison between the first network state and the second network state, determining whether a software bug is successfully reproduced in the replay environment; and debugging at least one of a correctness problem or a performance problem, in the configuration of the set of data-plane nodes, that is caused by the software bug.

9. The non-transitory computer-readable storage medium of claim 8, wherein obtaining the log information comprises:

capturing the multiple transactions from the control-plane node operating in a production environment to generate the log information.

10. The non-transitory computer-readable storage medium of claim 9, wherein obtaining the log information comprises:

generating the log information associated with transactions that include one or more of: (a) management-plane transactions associated with the management-plane node, (b) data-plane transactions associated with the set of data-plane nodes, and (c) replication transactions associated with a cluster that includes the control-plane node.

11. The non-transitory computer-readable storage medium of claim 8, wherein replaying the multiple transactions comprises:

processing, each of the multiple transactions, using an application implemented by the mock control-plane node to perform at least one of: distributed firewall configuration, logical network configuration, logical switch configuration, and logical router configuration.

12. The non-transitory computer-readable storage medium of claim 8, wherein replaying the multiple transactions comprises:

analyzing timestamp information associated with the multiple transactions; and based on the timestamp information, feeding the multiple transactions to the mock control-plane node at a replay speed.

13. The non-transitory computer-readable storage medium of claim 8, wherein determining whether the software bug is successfully reproduced comprises:

identifying the first network state based on first information generated by a publisher component of the control-plane node, wherein the publisher component is capable of pushing configuration changes to the set of data-plane nodes in a production environment; and identifying the second network state based on second information generated by a mock publisher component of the mock control-plane node, wherein the mock publisher component is capable of pushing configuration changes to the set of mock data-plane nodes in the replay environment.

14. The non-transitory computer-readable storage medium of claim 8, wherein determining whether the software bug is successfully reproduced comprises:

in response to identifying a match between the first network state with the second network state, determining that the software bug is successfully reproduced.

15. A computer system configured to perform software bug reproduction, the computer system comprising:

a processor; and a non-transitory computer-readable medium having stored thereon instructions that, in response to execution by the processor, cause the processor to:

obtain log information associated with multiple transactions atomically processed by a control-plane node to configure a set of data-plane nodes and transform an initial network state to a first network state, wherein each of the transactions is assigned with a unique transaction identifier (ID), and wherein the multiple transactions include management-plane, control-plane, and data-plane configuration transactions that respectively originate from a management-plane node, from the control-plane node, and from at least one of the set of data-plane nodes;

configure a replay environment that is initialized to the initial network state, and includes a mock control-plane node and a set of mock data-plane nodes to respectively mimic the control-plane node and set of data-plane nodes;

based on the log information, replay the multiple transactions using the mock control-plane node to configure the set of mock data-plane nodes and transform the replay environment from the initial network state to a second network state, wherein the transaction ID of each transaction is used to track a progress or result of the transaction throughout a processing pipeline of the mock control-plane node;

based on a comparison between the first network state and the second network state, determine whether a software bug is successfully reproduced in the replay environment; and debug at least one of a correctness problem or a performance problem, in the configuration of the set of data-plane nodes, that is caused by the software bug.

16. The computer system of claim 15, wherein the instructions that cause the processor to obtain the log information cause the processor to:

capture the multiple transactions from the control-plane node operating in a production environment to generate the log information.

17. The computer system of claim 16, wherein the instructions that cause the processor to obtain the log information cause the processor to:

generate the log information associated with transactions that include one or more of: (a) management-plane transactions associated with the management-plane node, (b) data-plane transactions associated with the set of data-plane nodes, and (c) replication transactions associated with a cluster that includes control-plane node.

18. The computer system of claim 15, wherein the instructions that cause the processor to replay the multiple transactions cause the processor to:

process, each of the multiple transactions, using an application implemented by the mock control-plane node to perform at least one of: distributed firewall configuration, logical network configuration, logical switch configuration, and logical router configuration.

19. The computer system of claim 15, wherein the instructions that cause the processor to replay the multiple transactions cause the processor to:

analyze timestamp information associated with the multiple transactions; and based on the timestamp information, feed the multiple transactions to the mock control-plane node at a replay speed.

20. The computer system of claim 15, wherein the instructions that cause the processor to determine whether the software bug is successfully reproduced cause the processor to:
- identify the first network state based on first information generated by a publisher component of the control-plane node, wherein the publisher component is capable of pushing configuration changes to the set of data-plane nodes in a production environment; and
- identify the second network state based on second information generated by a mock publisher component of the mock control-plane node, wherein the mock publisher component is capable of pushing configuration changes to the set of mock data-plane nodes in the replay environment.

21. The computer system of claim 15, wherein the instructions that cause the processor to determine whether the software bug is successfully reproduced cause the processor to:
- in response to identifying a match between the first network state with the second network state, determine that the software bug is successfully reproduced.

\* \* \* \* \*